B. A. GEURINK.
GAS BURNER.
APPLICATION FILED DEC. 19, 1913.

1,096,426.

Patented May 12, 1914.

WITNESSES=
O. M. Kappler
H. B. Fay

INVENTOR
Bernard A. Geurink
BY Jay Oberlin
ATTORNEYS

COLUMBIA PLANOGRAPH CO., WASHINGTON, D. C.

UNITED STATES PATENT OFFICE.

BERNARD A. GEURINK, OF EAST CLEVELAND, OHIO, ASSIGNOR TO THE TRENKAMP STOVE & MANUFACTURING COMPANY, OF CLEVELAND, OHIO, A CORPORATION OF OHIO.

GAS-BURNER.

1,096,426.   Specification of Letters Patent.   Patented May 12, 1914.

Application filed December 19, 1913. Serial No. 807,658.

*To all whom it may concern:*

Be it known that I, BERNARD A. GEURINK, a citizen of the United States, and a resident of East Cleveland, county of Cuyahoga, and State of Ohio, have invented a new and useful Improvement in Gas-Burners, of which the following is a specification, the principle of the invention being herein explained and the best mode in which I have contemplated applying that principle, so as to distinguish it from other inventions.

My invention relates to a gas burner for use in stoves, ranges and the like and which has been designed to provide a thorough intermixture of the gas and air and with the view of taking advantage of the incoming rush of the air to the greatest possible extent.

To the accomplishment of these and related ends said invention then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
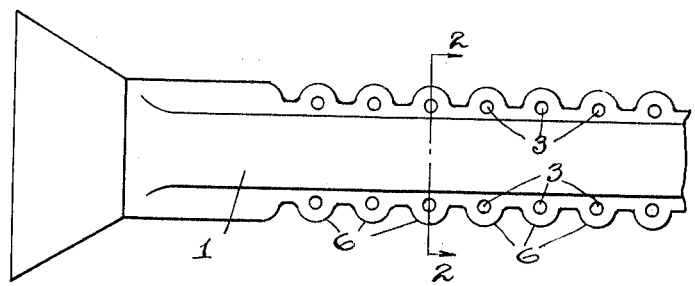
Figure 4:
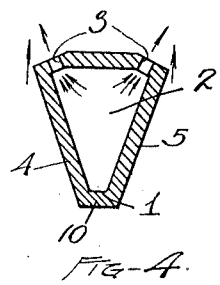
Figure 3:
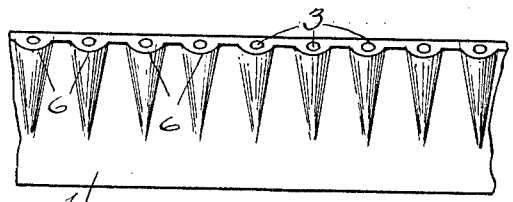
Figure 2:
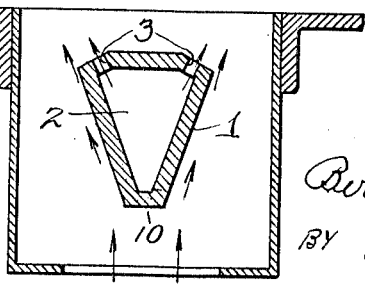

Figure 1 is a plan view of the burner; Fig. 2 is a section on the line 2—2 of Fig. 1, showing also a suitable burner casing; Fig. 3 is a side elevation of a portion of the burner, and Fig. 4 is a section on the line 2—2, Fig. 1.

The burner will be seen in Fig. 1 to consist of a suitable casing 1 provided with a passage 2 therethrough from which apertures 3 extend divergently, the gas passing from the central passage through these apertures. The form of the burner casing or conduit is preferably roughly triangular, the divergent apertures through which the gas is passed to the air being each substantially parallel with one of the two divergent sides 4 and 5 of the triangular casing, one edge 10 of which is turned toward, and is in the path of, the incoming air as illustrated by the arrows in Fig. 2. The inrushing air is thus passed substantially parallel with the incoming gas but at a very slight angle to the same and moves past the edge of the apertures 3 carrying the gas, thus drawing the same out and causing the gas to be thoroughly mixed with the air.

The foregoing result is increased by rounding the sides or edges 6 of the burner casing to roughly encircle the apertures supplying the gas, as best shown in Fig. 3. The air is thus permitted to move past substantially half of each aperture and this construction secures an extremely hot flame and consequently a good heating efficiency.

In Fig. 2 the action of the gas and air is illustrated by the arrows. The air is passed about the sides of the apertures and parallel to the edges of the same. In this way a much more effective mixing action can be secured than when the gas apertures are merely positioned adjacent to a straight edge, as in most burners now in general use. The length of the burner conduit will depend upon the use required, of course, but in any event it is desirable to space the apertures 3 a sufficient distance apart to permit an ample supply of air to be drawn up between the edges 6 of the adjacent apertures.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A gas burner, comprising a casing provided with a gas supply conduit therethrough, said casing having two straight diverging sides, and laterally directed holes opening into such conduit, certain of such holes lying parallel and adjacent to one of such straight sides, and the remainder of such holes being similarly disposed with respect to the other of such two straight sides.

2. A gas burner, comprising a casing having two diverging sides, a gas supply conduit extending through said burner, and a plurality of laterally directed holes opening into such conduit and disposed parallel to the walls of said burner, such walls being indented to roughly conform to such holes at the point of discharge of the same.

3. In a device of the character described, the combination of a receptacle open at top and bottom and having substantially straight parallel sides, a roughly triangular casing disposed in said receptacle with one edge directed toward the bottom of the same, said casing being provided with a gas supply conduit extending longitudinally therethrough, and two rows of holes disposed divergently in said casing and connecting with such conduit, each of such rows of holes being disposed parallel and adjacent to one of the two sides of said casing extending from such edge adjacent to the bottom of said receptacle, such two sides being indented to roughly conform to such holes at the point of discharge of the same.

Signed by me, this 13 day of December, 1913.

BERNARD A. GEURINK.

Attested by—
H. B. FAY,
A. L. GILL.

Copies of this patent may be obtained for five cents each, by addressing the "Commissioner of Patents, Washington, D. C."